United States Patent

Moser et al.

[11] 4,450,797
[45] May 29, 1984

[54] CRANK DRIVE FOR DIESEL ENGINE

[75] Inventors: Franz Moser; Tomas Visek, both of Steyr, Austria

[73] Assignee: Steyr-Daimler Puch Aktiengesellschaft, Vienna, Austria

[21] Appl. No.: 492,548

[22] Filed: May 11, 1983

Related U.S. Application Data

[63] Continuation of Ser. No. 228,926, Jan. 27, 1981, abandoned.

[30] Foreign Application Priority Data

Jan. 30, 1980 [AT] Austria ................... 477/80

[51] Int. Cl.³ ............................................. F02B 75/04
[52] U.S. Cl. ............................ 123/78 F; 123/197 AC; 384/255
[58] Field of Search ................... 123/78 R, 78 F, 197; 308/62, 236

[56] References Cited

U.S. PATENT DOCUMENTS

| | | | |
|---|---|---|---|
| 1,325,553 | 12/1919 | Bacon | 308/62 |
| 1,599,319 | 9/1926 | Crowe | 123/78 F |
| 2,155,766 | 4/1939 | Morison | 308/62 |
| 2,711,935 | 6/1955 | Miles | 308/62 |
| 4,254,743 | 3/1981 | Reid et al. | 123/197 AC |
| 4,319,498 | 3/1982 | McWhorter | 123/197 AC |

FOREIGN PATENT DOCUMENTS 465143 8/1951 Italy .......................... 123/78 E Primary Examiner—Craig R. Feinberg
Attorney, Agent, or Firm—Kurt Kelman

[57] ABSTRACT

This invention relates to an internal combustion engine, particularly to a diesel engine. The engine comprises a crankshaft, which is connected to each of a plurality of pistons by a connecting rod and a piston pin. Each connecting rod has two bearings for the piston pin and a crankpin of the crankshaft, respectively. In order to provide a desired piston clearance between the piston at its top dead center and the bottom of the cylinder head, at least one of the bearings of the connecting rod is provided with an eccentric ring disposed between the receiving bore and the bearing bushing. During the assembling of the engine, the eccentric ring is rotated to such a position that the desired piston clearance is obtained. The bearing ring is then fixed in the resulting rotational position.

2 Claims, 5 Drawing Figures

4,450,797

CRANK DRIVE FOR DIESEL ENGINE

CROSS-REFERENCE TO RELATED APPLICATION

This application is a continuation of U.S. Patent application Ser. No. 228,926, filed Jan. 27, 1981, now abandoned.

BACKGROUND OF THE INVENTION

This invention relates to an internal combustion engine, particularly a diesel engine, comprising a crankshaft and reciprocating pistons connected thereto by a connecting rod.

As the legislation regarding exhaust gases is becoming more and more stringent, it has become increasingly important to exactly provide a predetermined piston clearance between the piston at its top dead center and the bottom of the cylinder head. This is a requirement for high-compression four-stroke cycle engines and particularly for diesel engines. For manufacturing reasons it is difficult to ensure the desired piston clearance and to ensure that the difference between the piston clearances of different cylinders does not exceed an upper limit. Excessively large piston clearances will adversely affect the composition of the exhaust gases and will particularly result in higher contents of unburnt hydrocarbons and in diesel engines will often render the starting more difficult, particularly at low ambient temperatures, because in that case the air induced into cylinders having an excessively large piston clearance will not reach until the end of the compression stroke the temperature required for the self-ignition of the injected fuel. On the other hand, when the piston clearance is too small, the piston may engage the valves so that the engine may be damaged. In four-stroke cycle engines, a higher compression effected in cylinders in which the piston clearance is too small will result in knocking so that the ignition timing must be selected in accordance with the requirement for the cylinder which is least favorable in this respect although the ignition timing in cylinders having a correct piston clearance could be advanced so that the fuel consumption would be reduced.

In order to avoid these disadvantages, it is known to use pistons having different compression heights and to divide the pistons into classes in accordance with their compression height, which is the distance from the axis of the piston pin to the piston head. This measure involves high expenses in storage and in assembling and gives rise to difficulties in the case of repairs. Besides, it does not ensure the provision of the desired piston clearance in all cylinders. Alternatively, a compensation may be effected by the use of cylinder head gaskets having different thicknesses. That measure can be adopted only as a compromise in multicylinder engines having an integral cylinder head and cannot be used at all in engines in which the cylinder block and cylinder head constitute an integral casting.

It is also known to eccentrically mount the piston pin in the piston and to alter the eccentricity of the piston pin as the piston reciprocates. The eccentric member is either positively rotated by auxiliary drive means as the piston reciprocates (German Patent Specification No. 865,685; U.S. Pat. No. 2,029,169) or the eccentric member is designed to be rotated automatically under the action of different forces acting on the piston during the pumping cycle and during the power cycle (French Patent Specification No. 1,087,991; U.S. Pat. No. 1,931,705). A feature common to all these designs resides in that the piston is moved as close as possible to the cylinder head as the combustion gases are exhausted so that the volume for the residual exhaust gas is minimized. During the compression stroke, the eccentric member which is then in an upper position prevents the piston from approaching the cylinder head so closely that an excessively high compression ratio would be reached, which would result in combustion with knocking. In those designs it is not desired to maintain a predetermined piston clearance but to change the piston stroke or the compression ratio, during the operation of the engine.

It is an object of the invention to provide an internal combustion engine which is of the kind described first hereinbefore and in which a desired piston clearance can be provided in a simple manner and with adequate accuracy whereas it is not required to change the piston stroke during the operation of the engine.

This object is accomplished in accordance with the invention with a connecting rod bearing comprising a bearing bushing which is eccentric with respect to the associated receiving bore, or an eccentric ring which is fitted between the associated receiving bore and the bearing bushing, and the eccentric bearing bushing or the eccentric ring is adapted to be fixed in different rotational positions.

A rotation and subsequent fixation of the eccentric bearing bushing or the eccentric ring will result in a change of the effective length of the connecting rod without need for any machining of the connecting rod. By the change of the effective length of the connecting rod, the piston clearance will also be changed or adjusted to the desired value.

It will be particularly desirable to permit the eccentric bearing bushing or the eccentric ring to be fitted into the associated receiving bore in any desired rotational position because in that case the desired piston clearance can be individually and infinitely adjusted for each cylinder.

An eccentric member provided in the connecting rod big-end bearing may consist of a two-part eccentric ring so that commercially available bushings can be used for the connecting rod big-end bearing.

In accordance with a preferred further feature of the invention, which is particularly simple and is adequate in numerous cases and is particularly applicable to internal combustion engines in which the cylinder block and the cylinder head constitute an integral casting, the eccentric member is provided in the connecting rod big-end bearing and consists of a eccentric bearing bushing having two parts, which have abutting surfaces that are aligned with the abutting surfaces of the connecting rod body and the associated bearing cap, and the one-half sections of the bushing are interchangeably fitted in the receiving bore. In that case the one-half section of the bearing bushing having the larger wall thickness may be arranged on the body side or the cap side of the receiving bore. The adjustment which is thus permitted will be sufficient in many cases to ensure that the piston clearance will be within the prescribed tolerance range. An intermediate piston clearance can be obtained when the eccentric bearing bushing is replaced by a conventional bushing having a uniform wall thickness.

DETAILED DESCRIPTION OF THE INVENTION

Figure 1:
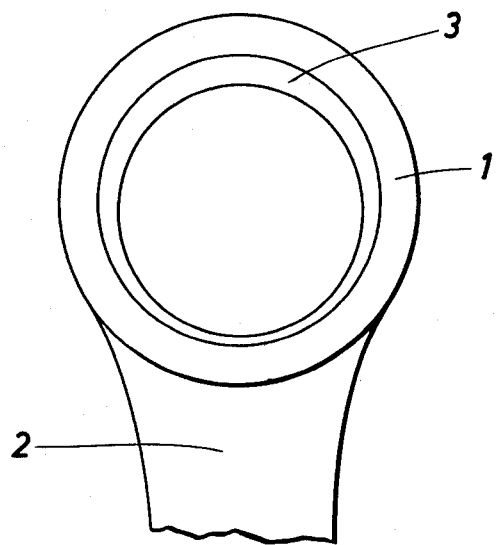
FIG. 1 is an elevation showing a connecting rod small-end bearing having an eccentric bearing bushing.
Figure 2:
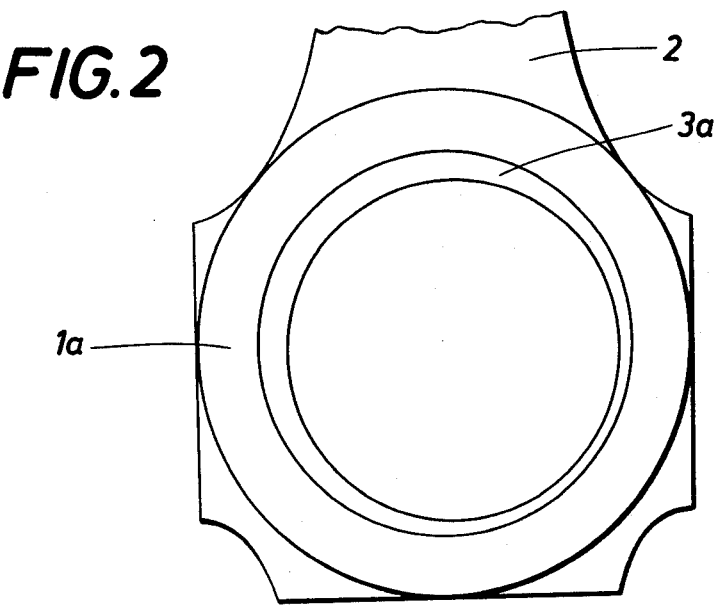
FIG. 2 is a similar view showing a connecting rod big-end bearing having an eccentric bearing bushing.

In accordance with FIG. 1, an eccentric bearing bushing 3 has been fitted into the small end bearing 1 of the connecting rod 2. That bearing bushing 3 can be rotated to change the effective length of the connecting rod 2 and the piston clearance. In accordance with FIG. 2, an eccentric bearing bushing 3a may alternatively be fitted into the big-end bearing 1a.

Figure 3:
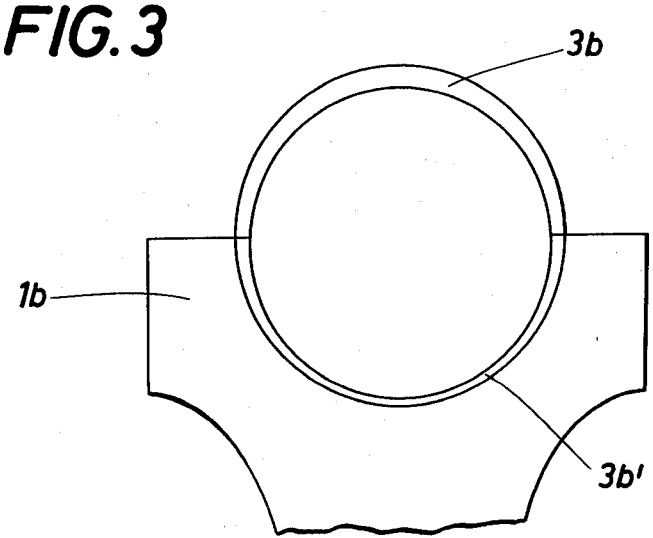
FIGS. 3 and 4 show a connecting rod big-end bearing without a bearing cap and with a bearing bushing consisting of two one-half sections and disposed in two positions.
Figure 4:
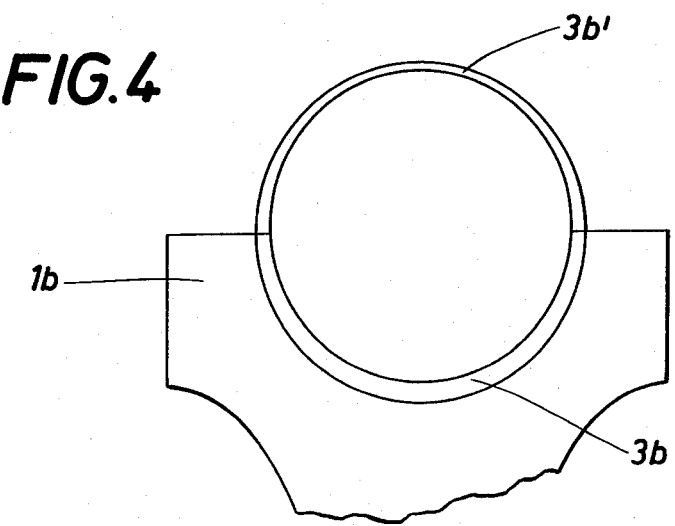

In accordance with FIGS. 3 and 4, the eccentric bearing bushing consists of two one-half sections 3b, 3b'. The abutting faces of the one-half sections of the bushing are aligned with the adjacent end faces of the body 1b of the connecting rod. The two one-half sections 3b, 3b' may be fitted in two positions, which are spaced 180 degrees apart and which determine two different effective lengths of the connecting rod. The bearing bushing section 3b which has a larger wall thickness may be disposed in the body-side portion (FIG. 4) or in the cap-side portion (FIG. 3) of the receiving bore.

Figure 5:
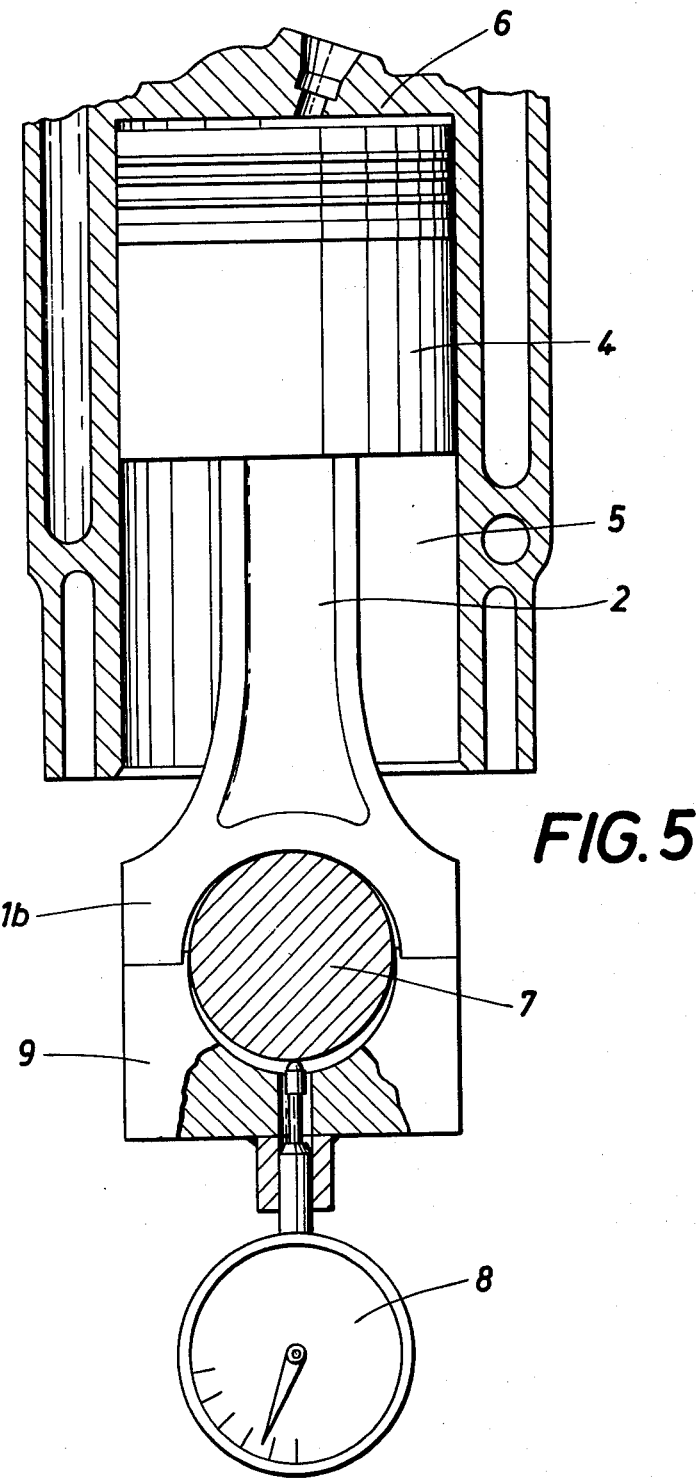
FIG. 5 is a sectional view showing the set-up for measuring the piston clearance.

The piston clearance is measured in accordance with FIG. 5 as follows. The piston 4 on which the connecting rod 2 has been mounted without a big-end bearing and bearing cap is pushed into the cylinder 5 until the piston engages the bottom 6 of the cylinder head. The crankshaft is then mounted in the cylinder block and the crankpin 7 associated with one cylinder 5 is moved to its top dead center position. The connecting rod is then raised until it engages the crankpin. In this way the width of the gap between the crankpin and the receiving bore of the connecting rod is measured by means of a dial gage 8 along the connecting rod axis extending through the center of the crankpin. Then the difference between the measured width of the gap and the desired piston clearance is ascertained. That difference corresponds to the compensation required to obtain the desired piston clearance. The bearing cap may be replaced, e.g., by a magnetic U-shaped member 9. Alternatively, a bearing cap may be provided which is secured by means of clamps to the connecting rod 2 and particularly to the body 1b of the connecting rod 2. The measurement by means of the dial gauge may be replaced by a capacitive or inductive measurement or by a measurement effected by ultrasonics.

What is claimed is:

1. A crank drive for a reciprocating piston of a plurality of pistons of a diesel engine, comprising a crankshaft having a crank pin, a connecting rod having two opposite ends, the connecting rod ends having annular bearing surfaces defining bores respectively receiving the crank pin and a piston pin carried by the reciprocating piston, at least one of the annular bearing surfaces being comprised of two parts having end faces in contact with each other along a plane passing through the axis of the one annular bearing surface, and an annular eccentric bushing exchangeably positioned in the bore of the said annular bearing surface between one of the pins and the one bearing surface, the annular eccentric bushing being comprised of two parts having end faces in contact with each other in said plane, the two eccentric bushing parts being symmetrical with respect to a median plane perpendicular to said plane passing through the axis and being selectively rotatable together by 180° increments in a circumferential direction, the eccentric bushing parts being fixed in position in the bore after rotation whereby the bushing provides a fixed eccentric bearing for the one connecting rod end, and being exchangeable in the bore with an annular bushing of uniform wall thickness.

2. The crank drive of claim 1, wherein the diesel engine comprises an integrally cast cylinder block and cylinder head receiving a respective one of the reciprocating pistons.

* * * * *